Feb. 10, 1970   A. ROSINGER   3,494,597
STIRRING DEVICES

Filed Jan. 8, 1968   3 Sheets-Sheet 1

INVENTOR
Arthur Rosinger

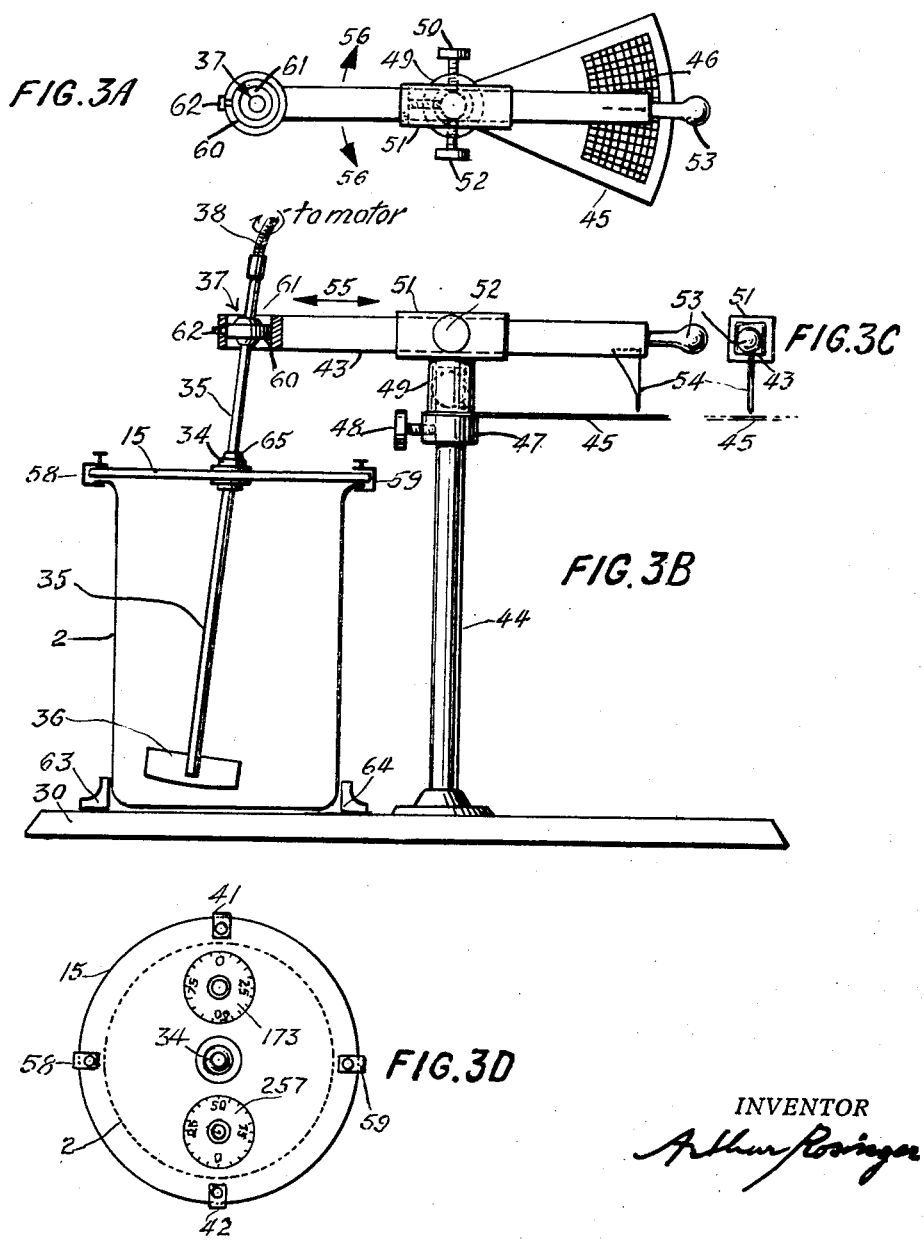

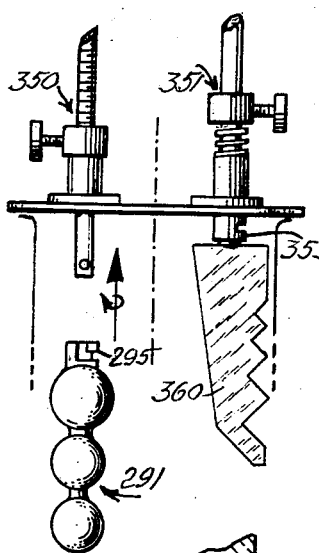
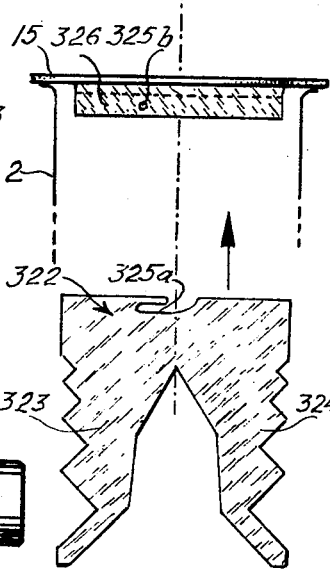
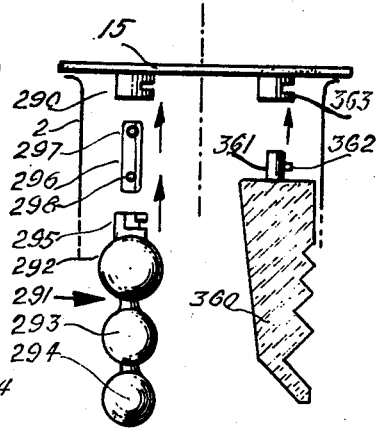
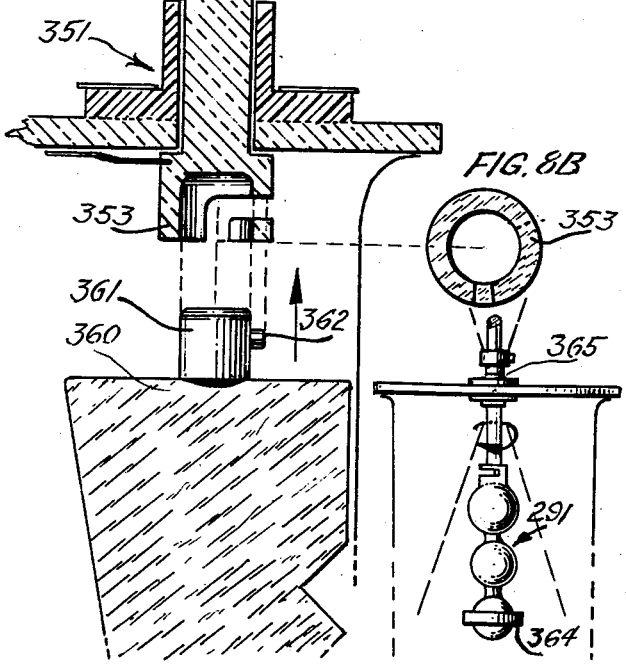
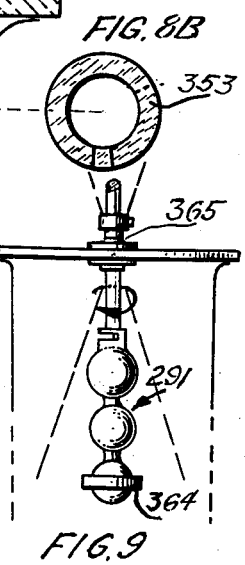
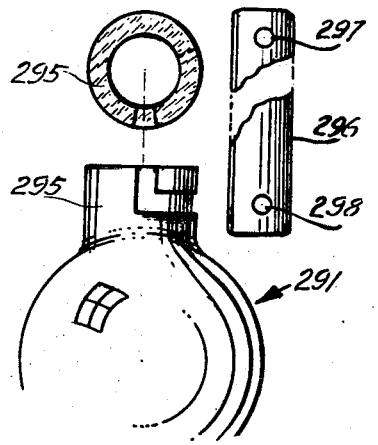
INVENTOR
Arthur Rosinger

United States Patent Office 3,494,597
Patented Feb. 10, 1970

3,494,597
STIRRING DEVICES
Arthur Rosinger, 32 Colonial Terrace,
Nutley, N.J. 07110
Filed Jan. 8, 1968, Ser. No. 696,429
Int. Cl. B01f 7/16, 15/00
U.S. Cl. 259—103                     35 Claims

ABSTRACT OF THE DISCLOSURE

This disclosure relates to improved stirring devices which include novel baffle elements having irregular shapes to provide improved stirring turbulences and a novel apparatus for adjusting the position of the agitator within the vessel in a mechanical stirrer.

IMPROVEMENTS IN STIRRING DEVICES

Field of invention

This invention relates ot stirring devices and more particularly to improved baffle arrangements therefor and to an improved adjustable drive means for mechanical stirrers.

Description of the prior art

The baffle elements for stirring devices presently known in the art consist generally of regularly shaped elements such as plates, rods and tubular configurations. A typical known baffle plate configuration is described in U.S. Patent No. 2,752,123 and typical known tubular configurations are described in U.S. Patent Nos. 3,265,368 and 3,334,870. These known baffle elements all have generally regularly shaped surfaces. They are also regularly shaped in the portions thereof which are nearest the wall of the vessel. Therefore, in U.S. Patent Nos. 3,265,368 and 3,334,870, for example, all of the fluid passing around the tubular elements and between the wall of the stirring vessel and the portion of the baffle element closest thereto, encounters substantially the same smooth, unidirectional surfaces all along the longitudinal surface of the baffle element. While these devices provide improved fluid turbulences and, therefore, improved mixing or stirring characteristics, it has been found that by utilizing a baffle element wherein the longutidinal surface thereof is irregularly shaped, further improved mixing is achieved. This improved mixing is mainly, due to the "coanda effect." According to the "coanda effect," a high speed fluid stream tends to follow the contour of a wall or surface over which it flows, even if the wall or surface curves away. By providing baffles with irregular surfaces to cause fluid streams to follow different paths during the stirring operation, it has been found that improved stirring (or agitating) of the fluid within the vessel results. It would further be desirable if baffle elements were provided with indexing mechanisms so that their positions could be accurately duplicated at any time.

Also, the presently known mechanical mixing or stirring devices utilize fixed shafts on which an agitator such as a propeller, a paddle, or the like is mounted. It would be desirable if there was available a mechanical stirring apparatus wherein the position of the shaft would be adjustable. This allows one to vary the position of the agitator within the vessel to provide more varied stirring turbulences. Also, the shaft should be provided with an indexing means so that the position thereof is readily ascertainable and duplicable so that any stirring operation could be accurately repeated.

SUMMARY OF THE INVENTION

Therefore, the main object of this invention is to provide baffle elements for a stirring device—magnetic or mechanical—which improves the stirring characteristics thereof.

Another object of the invention is to provide adjusting and indexing means for such baffle elements, thereby enabling duplication of the stirring effects.

Yet another object of this invention is to provide a novel apparatus for adjusting and indexing the position of the agitator within the vessel for a mechanical stirring device.

According to one aspect of this invention, there is provided an improved baffle arrangement for use with a vessel having mixing means, the baffle arrangement including a first portion, at least a part of the longitudinal surface thereof having an irregular shape. The baffle further includes a second portion for mounting the first portion within the vessel.

According to another aspect of this invention a stirring device includes a vessel, a drive shaft and an agitator mounted on said drive shaft. Further included is means for adjustably mounting the drive shaft to extend within the vessel so that the angular position of the shaft with respect to the vessel may be adjusted, and apparatus for adjusting the angular position of the shaft with respect to the vessel, thereby varying the position of the agitator within the vessel.

BRIEF DESCRIPTION OF THE DRAWINGS

FIGURES 3A, 3B, 3C and 3D illustrate a novel adjusting and indexing means for the agitator of the mechanical stirring device of FIGURE 2;

FIGURE 4 illustrates another baffle element according to this invention;

FIGURE 5 illustrates two other baffle elements according to this invention;

FIGURES 6A, 6B and 6C illustrate in more detail the resective portions of mounting arrangement for the baffle elements of FIGURE 5;

FIGURE 7 shows the baffle elements of FIGURE 5 adjustably mounted to the cover of a vessel; and FIGURES 8A and 8B show in more detail the mounting arrangement for one of the baffle elements of FIGURE 7.

DETAILED DESCRIPTION OF THE PREFERRED EMBODIMENTS

Figure 1:
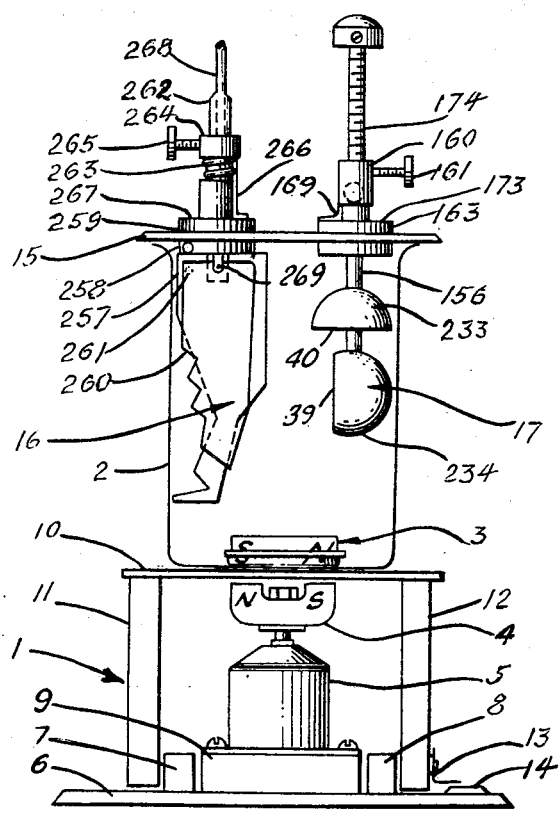
FIGURE 1 is an illustration of a magnetic stirrer having an adjustable platform and utilizing two of the novel baffle elements according to this invention.

Referring to FIGURE 1, there is shown a magnetic stirrer having an adjustable platform 1 which is similar to that shown in FIGURE 1 of my copending application, Ser. No. 696,428. The magnetic stirrer includes a platform arrangement 1, on which is mounted a vessel 2. A magnetic rotor 3 is placed in the vessel for cooperation with the magnet 4 mounted to motor 5 in a manner well known in the art.

The platform 1 comprises a base member 6 on which is mounted guide members 7 and 8. The motor 5 is mounted on a block 9 which is secured to base 6. The vessel support member 10 is mounted on members 11 and 12 which are slideably mounted on base 6 and which are guided by members 7 and 8, respectively. A pointer 13 is secured to member 12 for cooperation with a scale 14 which is secured to base 6. The elements 13 and 14 are for accurately locating the position of the vessel support 10 with respect to the base 6 and drive motor 5. The above portion of the system is substantially the same as that described with reference to FIGURE 1 of my copending application, Ser. No. 696,428. The platform could also be similar to that shown in FIGURE 24 of said copending application.

Mounted on the vessel 2 is a cover 15 to which is secured two of the baffle elements 16 and 17 according to the invention. Both of these baffle elements have irregularly shaped surfaces and therefore provide improved stirring characteristics. A more detailed discussion of how such improved stirring results appears below.

A detailed description of the baffle elements 16 and 17 and the method for mounting them to the cover 15 is given in my copending application, Ser. No. 696,428, with reference to FIGURES 30 and 26, respectively. Baffle element 17 is shown in greater detail in FIGURES 19 and 20 of said copending application and same reference numerals are used herein for similar structural components for ease of comparison.

Figure 2:
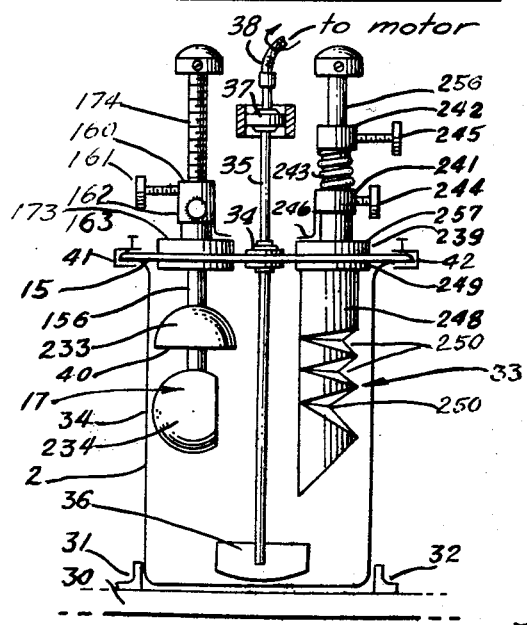
FIGURE 2 illustrates a mechanical stirring device having an adjustable agitator and two of the novel baffle elements according to the invention.

It is pointed out that the baffle elements 16 and 17 of FIGURE 1 may also be utilized with the mechanical stirrer of FIGURE 2. They are shown in the magnetic stirrer of FIGURE 1 merely by way of example and not as a limitation to the scope of my invention.

Referring to FIGURE 2, there is shown a mechanical stirring device according to the invention which utilizes the baffle element 17 of FIGURE 1 and another novel baffle element 33 according to the invention. The other baffle element 33 is substantially as shown and described in FIGURES 27 and 28 of my copending application, Ser. No. 696,428. The mounting methods are also the same and the same reference numerals are used herein for similar structural components for ease of comparison.

In FIGURE 2, the vessel 2 is mounted on a platform 30 and is retained in position by means of blocks 31 and 32 and 63 and 64 (shown in FIGURE 3B) which are secured to platform 30. Blocks 31, 32, 63 and 64 can be made adjustable to accommodate different sizes of vessels. Mounted in the cover 15 is a swivel-type shaft collar 34 through which is passed a shaft 35. Cover 15 is secured to the vessel by clamps 41 and 42 and 58 and 59 (see FIGURES 3B and 3D). A paddle 36 (or a propeller, if desired) is secured to the end of the shaft 35 within vessel 2 to agitate the fluid therein. A swivel-type shaft collar 37 is also mounted on shaft 35 and a flexible drive shaft 38 is secured to the end of shaft 35 which is outside the vessel 2. The flexible drive shaft 38 is connected to a motor or other source of rotary motion for imparting rotary motion to the shaft 35. The motor, or the like, is preferably a variable speed device and is not shown in FIGURES 2 and 3 for the sake of clarity. The swivel-type shaft collar 37 is secured to an adjusting mechanism as shown in FIGURES 3A and 3B for adjusting the position of the agitator paddle 36 in the vessel. The adjusting mechanism of FIGURE 3 is not shown in FIGURE 2 for the sake of clarity. Varying the position of the shaft 35 and paddle 36 changes the stirring characteristics of the stirrer of FIGURE 2 in a similar manner as moving the platform of the magnetic stirrer of FIGURE 1. The effects of these agitator adjustments are fully described in my copending application, Ser. No. 696,428, which relates to magnetic stirrers. However, the concepts described therein relate also to mechanical driven stirrers.

The baffle elements 16, 17 and 33 of FIGURES 1 and 2 all have a common feature; that is, they all have irregularly shaped surfaces. For example, the spherical segments 233 and 234 of baffle element 17 all have regularly shaped surfaces when taken alone, but when combined together to form the baffle element 17, a configuration with an overall irregularly shaped contour results. The regular portions of baffle elements 16 and 33 are the toothed or serated portions thereof. Baffle elements 16, 17 and 33 create improved turbulences in stirring devices by virtue of their irregular contours or surfaces.

As the fluid flows around these novel baffle elements, due to the above-mentioned "coanda effect," it tends to follow the contour of the surfaces of the baffle element. As the fluid flows over these irregular surfaces, the velocity thereof is changed. The amount of change in velocity in the fluid flow is dependent upon the size and contour of the surface to which it tends to conform in accordance with the "coanda effect." When the fluid streams pass the baffle elements they meet and combine to form a highly turbulent motion. This turbulence is created not only by the meeting of fluid streams having different velocities, but also by the fact that these various fluid streams have different directions of flow as they pass the baffle element. This is because the fluid tended to follow the contours of the baffles. It has also been found that the "coanda effect" provides the most effective results when the irregular contours of the baffles are placed where the speed of the rotating fluid mass is the highest-nearest the wall of the stirring vessel. The baffles according to this invention will provide improved stirring when the irregular surfaces are in other positions within the vessel, but they are most effective when placed near the wall thereof. For example, this effect is exhibited by baffle element 17.

As the fluid flows over the spherical surface portion of spherical segment 234, it tends to follow the surface thereof. Therefore, when the fluid streams converge after passing around element 234, the different velocities and directions of flow cause a desired turbulence. The fluid streams flowing past the portion of rod 156 between elements 233 and 234 also are caused to follow converging paths but in different directions than the fluid flowing over element 234. This further enhances the turbulence created in the fluid.

The flat portion 39 of segment 234 further improves the turbulence in a manner similar to a flat vertical baffle plate.

Spherical segment 233 also improves the turbulence when the fluid flows past its spherical surface in a manner similar to that described with respect to segment 234. However, the flat lower portion 40 of segment 233 acts as a horizontal deflector for deflecting some upward flowing fluid in a downward direction. This further enhances the turbulence in a stirrer utilizing baffle elements according to this invention. The resulting combination provides stirring turbulences which have heretofore been unobtainable with the baffle elements known in the art.

The upper curved surface of spherical segment 233, in addition to enhancing the fluid turbulence, serves to reduce splashing during operation of the stirrer. This again is due to the "coanda effect" which causes the fluid flowing over the top of segment 233 to be directed downward, thus reducing the tendency to splash.

It is pointed out that the upper spherical segment 233 may be replaced by a flat plate or the like having a horizontal flat surface similar to surface 40 of segment 233. In such a case, however, the horizontal plate would not be as effective as the spherical segment 233 since it would not exhibit the "coanda effect" and would not act as such an effective anti-splash device. It would merely serve as a horizontal deflector to direct fluid in a downward direction.

FIGURE 19 of my copending application, Ser. No. 696,428, shows a typical baffle element (such as baffle 17 of FIGURE 1) and typical fluid flows when the baffle is used in a stirrer.

It is pointed out that spherical segments 233 and 234, either one or both, may be replaced by complete spheres. Good mixing turbulences will result when using complete spheres, but better results are achieved when using segments thereof as shown in FIGURES 1 and 2. Also, when using segments, the stirring pattern can be varied by varying the angular position of the baffle 17 in the vessel. This effectively varies the position of the flat portion 39 and it should be clear how this variation will change the stirring pattern. Indexing means, including a scale on shoulder 163 and a pointer 169 are provided for recording the desired baffle position, thereby rendering the stirring operation easily duplicable at any time. Again while the shape of a sphere itself is regular, when mounted on a rod, the combined overall surface or contour of the baffle element is clearly seen to be irregular. More particularly when two spheres are mounted on a rod, the overall combined surface is also irregular.

It is further pointed out that the mounting and adjusting arrangements for baffle elements 16, 17 and 33 are as described in my copending application, Ser. No. 696,428, and are therefore not discussed in detail herein.

It is mentioned here that elements 233 and 234 are not limited to spherical shapes or to spherical segments. Other shapes such as surfaces of revolution (i.e., paraboloids, ellipsoids, hyperboloids, or the like) may be used in any combination or singly. More generally, the elements 233 and 234 may be replaced by bodies having curved surfaces or segments of bodies having curved surfaces or segments of bodies which have curved surfaces.

With respect to baffle element 16 of FIGURE 1, the extending (or protruding) portions of the separations on element 260 reduce the velocity of the fluid flowing between the extending portions and the wall of vessel 2. The fluid that passes between the cutout portions (or recesses) of the serrations and the wall of vessel 2 is slowed down to a lesser degree. As the different fluid flows having different velocities meet after flowing around baffle 16, an improved turbulence is created.

The baffle element 33 of FIGURE 2 exhibits the same general effects as baffle element 16 except that the serrated portions are also contoured to create further improved turbulences. As the fluid flows around contoured teeth 33, not only are the velocities of the flow change, but also, since the fluid tends to follow the contours, the directions of flow are changed. For example, the fluid flowing over the upper surface of any one of the contoured teeth will tend to flow downward after passing the baffle element 33. Fluid flowing over the lower surface of the same tooth will be directed upward and when the two fluid streams meet after passing baffle element 33, improved turbulence is created. This is an illustration of the "coanda effect."

It is pointed out that the baffle elements 16 and 33 of FIGURES 1 and 2, respectively, have serrations which vary in depth. The deeper cut serrations are at the lower ends of the baffle elements. This has been found to provide better results than with serrations of uniform depth.

Also, the member 248 (see FIGURE 2) is eccentrically mounted to shaft 256. This allows the distance between the wall of the vessel and the baffle member 248 to be varied as the angular position thereof is varied. Further, the serrations are in a substantial portion of element 248 and they vary in depth around said circumference. This further provides varied turbulences as the angular position of element 248 is varied.

Baffle element 16 of FIGURE 1 provides similar effects and adjustments as baffle 33 of FIGURE 2. However, an adjusting rod 268 is pivotally coupled to serrated member 260 and slideably mounted in member 262 for varying the distance between the wall of vessel 2 and the serrations in member 260 to vary the stirring pattern. Note that the width of baffle 16 is simultaneously varied, thereby further effecting the mixing properties of the stirrer. The rod 268 causes element 260 to pivot about pin 261 to produce these results. More details relating to the adjusting and mounting apparatus appears in the discussion of FIGURES 29 and 30 of my copending application, Ser. No. 696,428.

Also, the angular position of baffle 16 may be adjusted by rotating hollow shaft 262 and the position thereof is indicated by means of pointer 266 and scale 267. This further varies the mixing characteristics.

It is further pointed out that baffle element 17 of FIGURES 1 and 2 is further adjustable in height, the height being indicated by scale 174 in cooperation with the upper edge of shoulder member 160. Screw 161 is loosened to make this adjustment. The mounting arrangements for baffle elements 16 and 33 may be modified by one ordinarily skilled in the art within the spirit of this invention to provide height adjustments therefor. Referring to FIGURE 4 there is shown another baffle element 322 according to this invention and a particular means for attaching baffle element 322 to the cover 15 of the vessel 2. Baffle element 322 consists of two serrated leg portions 323 and 324 having a space therebetween. Only the portions of the legs 323 and 324 closest to the wall of the vessel 2 are serrated. It is also pointed out that the depth of the serrations increase towards the bottom of the vessel for reasons set forth hereinbefore and in my copending U.S. patent application Ser. No. 696,428. Baffle element 322 is removably mounted in the cover 231 by means of a slot 325a in the upper portion of baffle 322 which engages with a pin 325b which in turn is retained in channel member 326. Channel 326 is made as part of or is secured to the underside of the cover 15. This baffle configuration provides excellent agitation and stirring characteristics and is essentially a modification of the serrated baffles of FIGURES 1 and 2 wherein two such baffles are combined in one structure to provide further improved results. It is noted that the two legs 323 and 324 need not be identically shaped. They may be formed or dimensioned differently, depending upon the particular application.

Referring to FIGURE 5 there is shown another baffle element arrangement according to this invention. A slotted retaining member 290 is mounted to the cover 15 of vessel 2. The baffle element 291 includes three spheres 292, 293 and 294 having different diameters connected together to form one body 291 having an irregularly shaped surface. The spheres 292–294 may be hollow or solid. Also, they may be manufactured either separately and then attached together or they may be manufactured as one integral unit. To the upper portion of the baffle element 291 there is secured a slotted retaining member 295 similar to member 290. A rod 296 having protrusions 297 and 298 thereon is provided for mounting the baffle element 291 to the cover 231. This mounting arrangement is shown in larger scale in FIGURE 6. The operation of this type of mounting arrangement should be clear to those skilled in the art. It is pointed out that the height of the baffle element 291 may be easily varied by merely changing the length of the mounting rod 296. It has been found in practice that the baffle element 291 produces excellent turbulences and provides excellent stirring characteristics when used alone, in pairs or in combination with other baffle elements.

It is not necessary to provide angular adjusting means for the baffle element 291 of FIGURE 5 since its surface is symmetrical about its vertical axis. However, to achieve yet more varied stirring characteristics the retaining member 295 may be mounted offset with respect to the vertical axis of the spheres 292–294 of baffle element 291 and adjusting means for adjusting the angular position of baffle element 291 may be provided. In this case, by adjusting the angular position of baffle element 291 the distance between the wall of the vessel 2 and baffle element 291 is also varied. It should be clear from the foregoing discussions that the stirring characteristics will be likewise varied. Any of the various schemes described herein for adjusting the angular position of baffle elements may be adapted to the configuration of FIGURE 5 by anyone ordinarily skilled in the art within the spirit of this invention. An example of such an adjusting arrangement is shown in FIGURE 7.

Instead of mounting the retaining member 295 in an eccentric manner, one or two of the spheres 292–294 of the configuration of FIGURE 5 could be mounted eccenric to the others. Thus, by varying the angular position of the baffle element 291 by any of the various methods described herein, the distance between the wall of vessel 2 and the eccentric spheres will be varied, thereby changing the stirring characteristics of the stirrer. Also the elements 292, 293 and 294 need not be spheres; they may be any other symmetrical or non-symmetrical shape.

Also in FIGURE 5 there is shown a baffle element 360 which provides stirring characteristics similar to those provided by baffle 16 of FIGURE 1. Baffle 360 as shown is not adjustable, but may be provided with an adjustable mount as in FIGURE 7. Baffle 360 is mounted to cover 15 in a manner similar to baffle 291 via a slotted retainer 363 mounted to cover 15. A short shaft 361 with a protrusion 362 thereon is made as part of or is secured to baffle 360 to engage member 363 in a manner known in the art. It should be clear that this arrangement can be modified as shown for baffle element 291 to provide height adjustment capabilities.

FIGURES 7 and 8 show baffle 360 connected to a configuration 351 for angularly adjusting baffle 360 within the vessel. Adjusting configuration 351 is not described in detail since it is substantially the same as the adjusting means ilustrated for baffle 16 of FIGURE 1. The basic difference therebetween is the method used to secure the baffle 360 to the rod 352 (FIGURES 7 and 8) of the adjusting means 351. Rod 352 has a retaining member 353 on the lower end thereof which is similar to member 363 of FIGURE 5. The operational advantages of adustably mounting baffle 360 should be apparent in view of the foregoing discussion of the baffles of FIGURES 1 and 2.

Referring to FIGURE 9, there is shown a baffle element 291 (similar to the baffle element 291 of FIGURE 2) which is suspended in the center of a cover plate of the vessel. The baffle element 291 is rotatably suspended by means of a swivel joint 365 which is similar to those swivel joints described in FIGURE 3. Mounted at the bottom end of baffle element 291 is a ring 364 which may be made of Teflon or the like. The baffle element 291 may be angularly displaced within limits as indicated by the dashed lines in FIGURE 9 and may also rotate about its longitudinal axis.

In operation, the baffle element 291 as mounted in FIGURE 9 provides a very effective means for substantially reducing the formation of a vortex pattern in a magnetic stirrer. As the fluid within the vessel is being stirred, the baffle element 291 tends to follow the direction of flow of the fluid and is deflected angularly such that the ring 364 contacts the sidewalls of the vessel. The baffle element 291 will also tend to follow the flow of the fluid and therefore, since the ring 364 contacts the sidewall of the vessel, the baffle element 291 will also rotate about its own longitudinal axis. It is pointed out that baffle element 291 need not be formed only of spherical bodies as shown in FIGURE 9. The spherical bodies shown in FIGURE 9 may take the form of any other symmetrical or nonsymmetrical shape, as desired. When a nonsymmetrical shape is used however, it is clear that as the baffle element 291 rotates about its longitudinal axis when the ring 364 contacts the wall of the vessel, varying stirring patterns will result.

It is pointed out that with baffle elements according to this invention, a stirrer is provided which substantially eliminates the formation of the undesirable vortex pattern and which can provide a substantially flat fluid level while providing improved fluid turbulences. Also, indexing means are provided such that once a desired stirring pattern is found, it may be easily and accurately duplicated.

It is further pointed out that the baffle elements according to this invention may be fabricated with heating elements inserted or embedded therein, thereby eliminating the need for additional heaters when heating of the fluid is desired. The baffles provided by my invention are ideally suited for such use since they have a relatively large surface area. This will improve the transfer of heat to the fluid.

Referring to FIGURES 3A, 3B, 3C and 3D, there is shown a novel mechanism for adjusting and indexing the adjustment of the agitator 36 shown in FIGURE 2. The baffle elements are not shown in FIGURES 3A, 3B, 3C and 3D for the sake of clarity and the same reference numerals are used in FIGURES 2 and 3 wherever possible. In FIGURE 3D, however, the scales 173 and 257 for indexing the angular positions of a baffle element mounted in cover 15 are shown. These particular scales are shown only by way of example and other types of scales may be used. In FIGURE 3D the cover 15 is shown without the shaft 35 and without baffle elements inserted therein. Only the openings to receive the above-mentioned items are shown.

A post 44 is secured to base 30 and a member 45 having a scale 46 thereon is secured to post 44 by means of a collar 47. A screw 48 is threadably mounted in collar 47 for bearing upon the post 44 to lock the relative positions of the post 44 and the collar 47. A collar 49 is mounted to post 44 and a screw 50 is threadably inserted therein to lock the relative positions of collar 49 and post 44. When screw 50 is loosened, collar 49 is adapted to rotate about the axis of post 44.

Secured to collar 49 is a hollow rectangularly shaped member 51 in which a screw 52 is threadably mounted. A member 43 having a rectangular cross-section is slideably mounted within member 51 and screw 52 is adapted to bear upon member 43 to lock the relative positions of members 43 and 51. Member 43 has a hollow circular end portion within which a swivel-type shaft collar 37 is mounted. Screw 62 is threadably mounted in member 43 to lock swivel 37 in place. Member 43 further has a pointer 54 secured thereto which cooperates with scale 46 to indicate the position of member 43. A handle 53 is also secured to member 43 to facilitate adjustments thereof and clamps 41, 42, 58 and 59 are provided to lock the cover 15 to vessel 2. Mounted in cover 15 is a swivel-type shaft collar 34. A shaft is passed through the swivel-type shaft collar 37 and through the swivel-type shaft collar 34 and an agitator 36 (a paddle) is secured to the lower end thereof. The shaft 35 has a ring 65 secured thereto which acts as a stop member against swivel-type shaft collar 34 to control the length of the shaft 35 within the vessel 2, thereby controlling the depth of the agitator 36 within the fluid. In the illustrated embodiment the shaft is slideably fit in swivel-type shaft collars 34 and 37 so means such as ring 65 is required. As an alternative, the shaft 35 may be press fit into the bore of the swivel 34. Note that the shaft 35 must be slideably fit within one of the swivel-type shaft collars to prevent undue stress on the apparatus when the angular position of the shaft with respect to the vessel is varied. Alternatively, the shaft could be secured to swivel-type shaft collar 37, but as the angular position of the shaft was varied, the depth of the agitator within the fluid will also change. For some applications, this effect may be desirable.

A motor or other source of rotary motion (not shown) is secured to shaft 35 via a flexible shaft 38.

At this point a more detailed description of the swivel-type shaft collars 34 and 37 is in order. For convenience, they are hereafter referred to as swivels. Swivel 37 will only be described since swivels 34 and 37 are identical in this embodiment. Swivel 37 includes a retainer ring 60 within which is mounted a ball segment 61 which has a bore therein for accommodating shaft 35. Ball segment 61 is mounted within retainer ring 60 in much the same fashion as a ball bearing is mounted in a retainer ring. The ball segment 61 can rotate in retainer ring 60 when it is in almost any angular position within limits which are determined by the size of the shaft and the dimensions of the ring 60 and ball 61. In this particular embodiment, the shaft 35 was slideably mounted in the bore of the ball segment 61, but it should be clear that other mounting methods may be used. For example, they may be press-fit or the like, depending upon the application.

As can be readily seen from FIGURES 3A–3C, adjustments in the angular position of the shaft and of the position of the attached agitator 36 within the vessel 2 may be made from outside the vessel by merely moving member 43 within the member 51 in the direction of the arrows 55 of FIGURE 3B and/or by swiveling the member 43 about the post 44 in the direction of the arrows 56 of FIGURE 3A. The former adjustment is made by loosening the screw 52 and the latter by loosening screw 50. In both cases, the screws should be re-tightened after adjustments are made. The position of the shaft 35 and agitator 36 is indicated by means of pointer 54 and scale 46.

The scale 46 is of the polar coordinate type in this example and when used in conjunction with pointer 54, accurate and easily duplicable stirring patterns are made possible in mechanically operated stirrers. This configuration provides similar results as my magnetic stirrers described in application, Ser. No. 696,428, but an extra fitting must be supplied in the cover 15 to accommodate swivel 34.

It is believed that the operation of the adjusting mechanisms of FIGURE 3 in conjunction with the scale 46 and pointer 54 is self explanatory and a detailed description thereof is deemed unnecessary for a proper understanding of this invention.

It is also pointed out that members 43 and 51 need not be rectangular in shape, but may be any other convenient shape or configuration which will prevent rotation of element 43 within element 51 about a horizontal axis.

It should be clear to those ordinarily skilled in the art that the above-described linear and arcuate motion of the member 43 may be achieved by means of rack and pinion gears. In this case, the exact position of member 43 may be made by those skilled in the art within and may be indexed by means of appropriate scales (such as a vernier dial or the like) which are connected to the pinions. Any position may be duplicated merely by duplicating the former dial readings. It should be clear that other modifications to the adjusting apparatus for member 43 may be made by those skilled in the art within the spirit of my invention.

The apparatus illustrated in FIGURES 3A, 3B, 3C and 3D may be further modified by mounting the upper swivel-type shaft collar in a fixed position and coupling the adjusting mechanism to the lower shaft collar. The modifications of the illustrated system to provide such a system may be easily carried out by one ordinarily skilled in the art within the spirit of my invention.

The system of FIGURES 3A, 3B, 3C and 3D may be further modified by those ordinarily skilled in the art by fixedly mounting the upper swivel-type shaft collar 37 and eliminating the adjusting mechanism (comprising element 43) which is shown connected thereto in FIGURES 3A and 3B. In such a case, adjustments in the position of the agitator 36 within the vessel are made by moving the vessel. The upper surface of the platform 30 may be provided with a coordinate system printed thereon to index the position of the vessel, thereby indexing the position of the agitator within the vessel. To duplicate the previous agitator position, the vessel is merely placed in the previously recorded position. A typical coordinate system for vessel platforms and method for accurately locating the position of a vessel thereon is described in detail in my copending application, Ser. No. 696,428, with reference to FIGURES 24 and 25 thereof.

All of the above-described systems for adjusting the position of an agitator within a vessel provide substantially equivalent operational results. The system used will depend on factors such as cost, size, type of cooperating apparatus available, etc. It is recognized that many other implementations of my invention may be made by those skilled in the art within the scope of my invention.

It is further pointed out that any of the baffle elements according to this invention may be used alone, in identical pairs or any other combination which provides the desired stirring pattern.

Also, it should be clear that the baffle elements according to this invention and all of the other mixer elements may be made of or covered by glass, Tenon, or other inert, rust resistant and solvent resistant materials.

While I have described above the principles of my invention in connection with specific apparatus, it is to be clearly understood that this description is made only by way of example and not as a limitation to the scope of my invention, as set forth in the accompanying claims.

I claim:
1. A baffle for use with a vessel having mixing means, comprising:
   a first portion, at least a part of the surface thereof having an irregular shape;
   a second portion for adjustably mounting said first portion within said vessel; and
   indexing means coupled to said baffle to indicate the position of said baffle relative to said vessel.

2. A baffle according to claim 1 wherein said first portion includes a member having serrations in at least a portion of the surface thereof.

3. A baffle according to claim 2 wherein said member is an elongated member having said serrations on a substantial part of the periphery thereof.

4. A baffle according to claim 3 wherein the depth of said serrations varies at different points around said periphery.

5. A baffle according to claim 2 wherein said member is an elongated member extending into said vessel and wherein said serrations increase in depth towards the lower end thereof.

6. A baffle according to claim 2 wherein said member is an elongated member having a substantially circular periphery.

7. A baffle according to claim 6 wherein said member is an elongated member having a substantially cylindrical shape and wherein said serrations increase in depth towards the lower end of said member, the width and depth of each individual serration increasing from zero to a maximum value and then decreasing back to zero around the substantially circular periphery of said substantially cylindrical member.

8. A baffle according to claim 2 wherein said member is a plate having said serrations in at least one edge thereof.

9. A baffle according to claim 8 wherein said first portion further includes:
   a second plate secured to the second portion of said baffle; and
   means for pivotally securing said first serrated plate to said second plate for adjusting the position of said serrated portion of said first plate within said vessel and for adjusting the effective width of said baffle.

10. A baffle according to claim 9 further including means pivotally connected to said first plate and slidably mounted in said second portion of said baffle for adjusting the position of said first plate relative to said second plate, thereby adjusting the position of said serrated portion within said vessel and simultaneously varying the width of the baffle.

11. A baffle according to claim 2, wherein said first portion includes two legs, each of said legs having serrations in at least a portion of the surface thereof.

12. A baffle according to claim 1 wherein said first portion includes:
   at least a first member which is at least a segment of a body having a curved surface; and means connecting said first member to said second portion of said baffle.

13. A baffle according to claim 12 further comprising a second member which is at least a segment of a body having a curved surface, mounted on said connecting means.

14. A baffle according to claim 13 wherein:
each of said members are segments of bodies having curved surfaces and each of said members has a substantially flat portion, the substantially flat portion of said first member being in a substantially vertical plane and the substantially flat portion of said second member being in a substantially horizontal plane; and
said second member is mounted above said first member on said connecting means.

15. A baffle according to claim 14 wherein said second member is substantially dome shaped.

16. A baffle according to claim 12 wherein said first member is at least a segment of a substantially spherical body.

17. A baffle according to claim 12 wherein said first member is a segment of said body and has a substantially flat portion.

18. A baffle according to claim 12, wherein said first member includes a substantially spherical body.

19. A baffle according to claim 18, including a plurality of substantially spherical bodies mounted on said connecting means.

20. A baffle according to claim 19, including at least two substantially spherical bodies having different diameters, said bodies being connected together in order of decreasing size, the larger body being at the top of said baffle element.

21. A baffle according to claim 1 wherein said first portion is comprised of a combination of substantially flat and curved surfaces in any relative proportions.

22. A baffle according to claim 1 wherein said first portion includes at least one substantially flat horizontal surface on the upper portion thereof to act as a horizontal deflector for the fluid being stirred.

23. A baffle according to claim 1 wherein said second portion of said baffle includes means for adjusting the angular position of said first portion within said vessel said indexing means indicating the angular position of said first portion within said vessel.

24. A baffle according to claim 1 wherein said second portion includes means for adjusting the height of said first portion within said vessel, said indexing means indicating the height of said first portion within said vessel.

25. A baffle according to claim 1 wherein said second portion includes means for freely suspending said first portion within said vessel such that said first portion is free to move about within said vessel.

26. A baffle according to claim 25 wherein said first portion includes a plurality of substantially spherical bodies connected together.

27. A baffle arrangement for use with vessels having mixing means, comprising:
a first portion located within said vessel; and
means operationally distinct from said mixing means for freely suspending said first portion within said vessel such that said first portion is free to move about.

28. A baffle arrangement according to claim 27 wherein said suspending means includes a swivel device connected to said first portion to thereby allow said free movement within said vessel.

29. A baffle arrangement according to claim 28 wherein said vessel includes a cover, said swivel device being mounted to said cover.

30. A baffle arrangement according to claim 29 wherein said swivel device is a swivel-type shaft collar and wherein said first portion includes an extended shaft connected to said swivel-type shaft collar.

31. A baffle arrangement according to claim 30 wherein said extended shaft extends through said swivel and through said cover, thereby enabling adjustment of the height of said first portion within said vessel.

32. A baffle arrangement according to claim 27 wherein said freely suspending means further allows rotation of said first portion about a longitudinal axis thereof.

33. A baffle arrangement according to claim 27 wherein said first portion includes means forming a bearing surface for bearing against the side of said vessel during operation of said mixing means.

34. A baffle arrangement according to claim 33 wherein said means forming said bearing surface includes a substantially ring-shaped element proximate to the lower end of said first portion.

35. A baffle arrangement according to claim 33 wherein said means forming said bearing surface is comprised of Teflon or the like.

References Cited
UNITED STATES PATENTS

| | | | |
|---|---|---|---|
| 1,308,953 | 7/1919 | Johnson | 259—106 |
| 1,415,735 | 5/1922 | Trust | 259—102 |
| 2,064,861 | 12/1936 | Stroud | 259—108 |
| 2,962,268 | 11/1960 | Soltermann | 259—102 X |
| 3,265,368 | 8/1966 | Nocera | 259—108 |

ROBERT W. JENKINS, Primary Examiner